W. B. STANLEY.
Wagon Brakes.
No. 137,633.
Patented April 8, 1873.
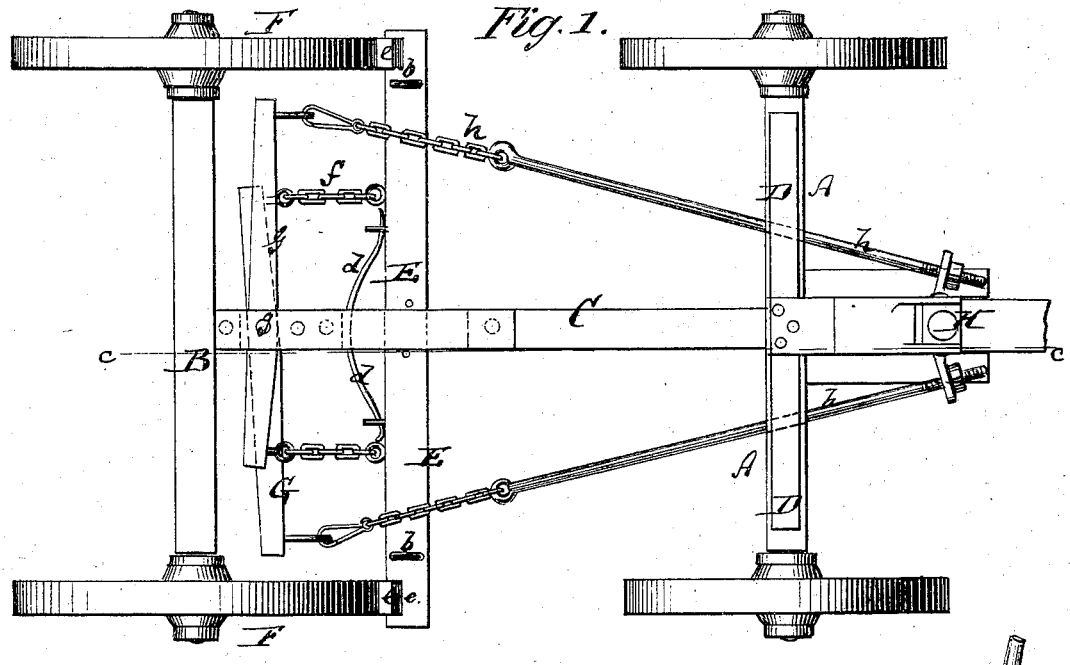
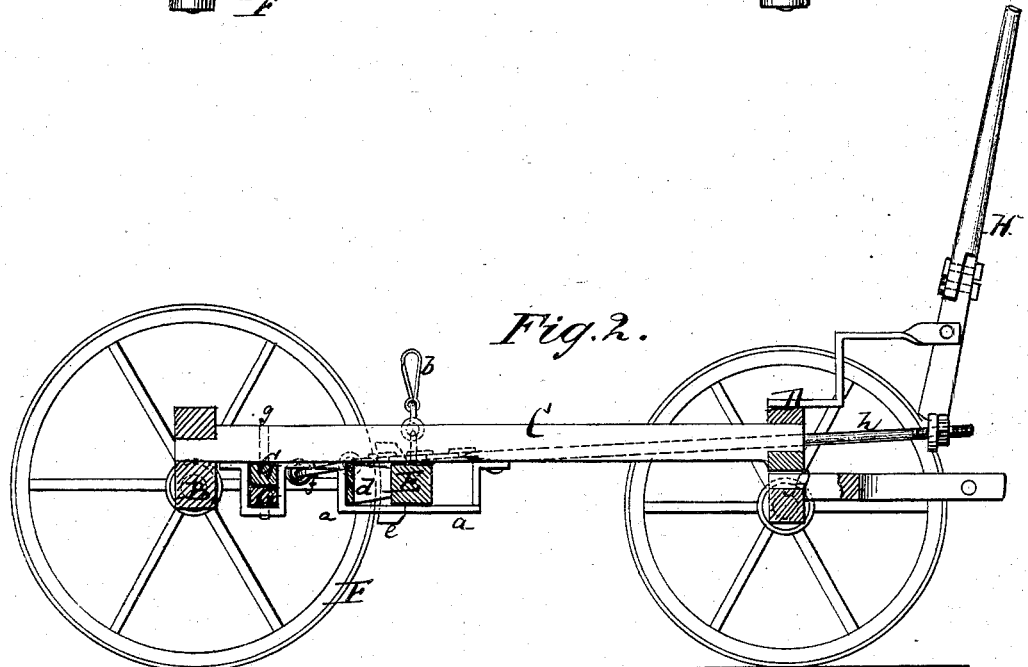

UNITED STATES PATENT OFFICE.

WILLIAM B. STANLEY, OF GROVETON, NEW HAMPSHIRE.

IMPROVEMENT IN WAGON-BRAKES.

Specification forming part of Letters Patent No. 137,633, dated April 8, 1873; application filed December 9, 1872.

*To all whom it may concern:*

Be it known that I, WILLIAM B. STANLEY, of Groveton, in the county of Coos and State of New Hampshire, have invented a new and Improved Wagon-Brake, of which the following is a specification:

Figure 1 is a top view of my invention; Fig. 2, a vertical longitudinal section of the same taken on the line C C, Fig. 1.

Similar letters of reference indicate corresponding parts.

The invention consists in the improvement of wagon-brakes, as hereinafter described and pointed out in the claim.

In the drawing, the letter A represents the front axle of the wagon. B is the rear axle thereof; C, the reach; D, the front bolster rigidly connected with the reach. E is the brake-beam, supported in the middle by a strap, *a*, which is fastened to the under side of the reach. At the ends the brake-beam may be steadied and partly supported by short chains *b b* that connect it with the wagon-body. *d* is a spring, secured in the strap *a*, and bearing against the back of the brake-beam in the manner shown, to hold the same as far forward as possible, and thus keep the brake-shoes *e e* off the hind wheels F. By means of short chains *f f* the brake-beam is connected with two levers, G G, which are by a pin, *g*, pivoted to the reach behind the beam E. The connection of the beam E with the levers G is made with the short ends of the latter; their long ends or arms are by rods *h h* connected with a lever, H, which is pivoted to the front of the wagon-body, or to any suitable projection of the front bolster.

When the lever H is swung back by the driver of the wagon the long arms of the levers G G will be swung forward and their short arms thereby carried back, so that they will draw the beam E back in equal degree on each side of the reach, and thereby firmly apply the brake-shoes against the wheels F. The rods *h h* have parts formed of chains, so that the same can be extended or contracted at will, in conformity with the contraction or extension of the wagon-reach, if it should be found necessary to vary the length of the same.

Having thus described my invention, I claim as new and desire to secure by Letters Patent—

The rods *h h*, provided with screw and nut at one end and chain at the other, combined with levers G G and extensible reach, as and for the purpose described.

WILLIAM B. STANLEY.

Witnesses:
    E. F. BROWNELL,
    A. G. WHITTEMORE.